(12) United States Patent
Mitchell

(10) Patent No.: US 9,747,817 B2
(45) Date of Patent: Aug. 29, 2017

(54) SELECTIVELY MOVABLE FOOT MODEL WITH CORDS

(76) Inventor: John Mitchell, Wayland, IA (US)

( * ) Notice: Subject to any disclaimer, the term of this patent is extended or adjusted under 35 U.S.C. 154(b) by 599 days.

(21) Appl. No.: 12/889,621

(22) Filed: Sep. 24, 2010

(65) Prior Publication Data
US 2011/0076661 A1    Mar. 31, 2011

Related U.S. Application Data

(60) Provisional application No. 61/245,993, filed on Sep. 25, 2009.

(51) Int. Cl.
*G09B 23/30* (2006.01)
*G09B 23/32* (2006.01)

(52) U.S. Cl.
CPC ........... *G09B 23/32* (2013.01); *G09B 23/30* (2013.01)

(58) Field of Classification Search
CPC .... A63H 3/36; A63H 3/46; A61F 2/60; A61F 2002/6614; G09B 23/00; G09B 23/28; G09B 23/30; G09B 23/32
USPC ........... 434/267, 274; 446/331, 390; 623/53
See application file for complete search history.

(56) References Cited

U.S. PATENT DOCUMENTS

| | | | | |
|---|---|---|---|---|
| 2,108,229 A | * | 2/1938 | Metz | G09B 23/32 434/274 |
| 2,472,819 A | * | 6/1949 | Giesen | G09B 23/32 434/274 |
| 3,188,753 A | | 6/1965 | Lovercheck | |
| 4,332,570 A | * | 6/1982 | Getty | G09B 23/32 434/274 |
| 4,466,800 A | * | 8/1984 | Breiden | G09B 23/32 434/267 |
| 6,582,232 B1 | * | 6/2003 | Ney | G09B 23/32 434/264 |

FOREIGN PATENT DOCUMENTS

| | | | | |
|---|---|---|---|---|
| SU | 1156116 A | * | 5/1985 | |
| SU | 1156116 A | * | 5/1985 | |
| SU | 1220010 A | * | 3/1986 | |

OTHER PUBLICATIONS

International Search Report dated Nov. 9, 2010 from counterpart PCT Application.

* cited by examiner

*Primary Examiner* — Gene Kim
*Assistant Examiner* — Alyssa Hylinski
(74) *Attorney, Agent, or Firm* — Shuttleworth & Ingersoll, PLC; Brett Papendick

(57) ABSTRACT

A foot model having a plurality of segments representing the bones of a human foot. The segments are held together through a series of elastic cords. A portion of the segments contain hollow portions and/or tunnels which the elastic cords are placed in and through. The cords and segments form a first position of the foot model which demonstrates a normal human foot. The cords can be manipulated by pulling and other forces to arrange the segments in a second position. The second position demonstrates a foot ailment or condition such as club foot. The model can be manipulated to regain the first position and any position in between the first and second position.

7 Claims, 6 Drawing Sheets

SELECTIVELY MOVABLE FOOT MODEL WITH CORDS

CROSS-REFERENCE TO RELATED APPLICATIONS

The present application claims priority to provisional patent application 61/245,993 which was filed on Sep. 25, 2009, and is hereby expressly incorporated by reference in its entirety.

BACKGROUND OF THE INVENTION

Over the years, models have been utilized in the medical field to demonstrate the functionality of body parts. Although many models have the ability to display the normal structure of a particular body part or a diseased structure of an affected body part, the models rarely are able to demonstrate both on the same model. Additionally, past models lack moving parts which would allow the models to demonstrate a first position and a second position.

In relation to foot models of the human foot specifically, models exist which demonstrate the skeletal structure, nerve structure, muscle structure or a combination. None of the known models have the ability; however, to form a first position demonstrating a normal foot structure and a second position demonstrating an affected foot structure including flat foot, club foot, high arch, vertical talus, inversion, eversion, plantar flexion, and other foot and ankle abnormalities.

One ailment which would benefit in having a model capable of two positions is that of "club foot." Clubfoot describes a range of foot abnormalities usually present at birth (congenital) in which a baby's foot is twisted out of shape or position. The term "clubfoot" refers to the way the foot is positioned at a sharp angle to the ankle, like the head of a golf club. Clubfoot is a common birth defect and is usually an isolated problem for an otherwise healthy newborn. Clubfoot can be mild or severe, affecting one or both feet. Clubfoot won't hinder a child's development drastically until it's time for the child to walk. At that stage, the awkward positioning of the foot may force the child to walk on the outside edge of his or her feet.

Treatment entails manipulating the foot into a correct position and casting it to maintain that position. Repositioning and recasting occurs every week for several weeks. After the shape of the foot is realigned, its maintained through stretching exercises, special shoes or splinting at night for up to two years.

Therefore, a foot model demonstrating the skeletal structure of a club foot as well as the skeletal structure of a normal foot would be useful in educating individuals about the abnormality and the corrective methods available to treat club foot in particular.

SUMMARY OF THE INVENTION

A foot model made from a plurality of segments representing the bones of a human foot is assembled in such a way to demonstrate a normal human foot in a first position. Each segment preferably represents one bone of the human foot.

The segments can include a hollow portion or a tunnel structure, some segments including more than one tunnel structure. A series of cords connects the segments to form the foot model and maintain the model in a first position. The first position demonstrates a normal human foot.

The cords are preferably elastic and can be manipulated such that the model achieves a second position. The manipulation can be the pulling of one or more of the elastic cords. The manipulation of the cords forces one or more of the segments to realign in relation to other segments. The realignment of the segments into the second position allows the model to demonstrate an abnormal foot condition including club foot. The model can achieve many positions between the first position and the second position. Additionally, the model can be selectively moved back and forth between the first and second positions. The elasticity of the cords in conjunction with the resistance on the cord provided by the segments maintains the model in a particular position until the cords are manipulated by a user of the model.

DETAILED DESCRIPTION

Figure 1:
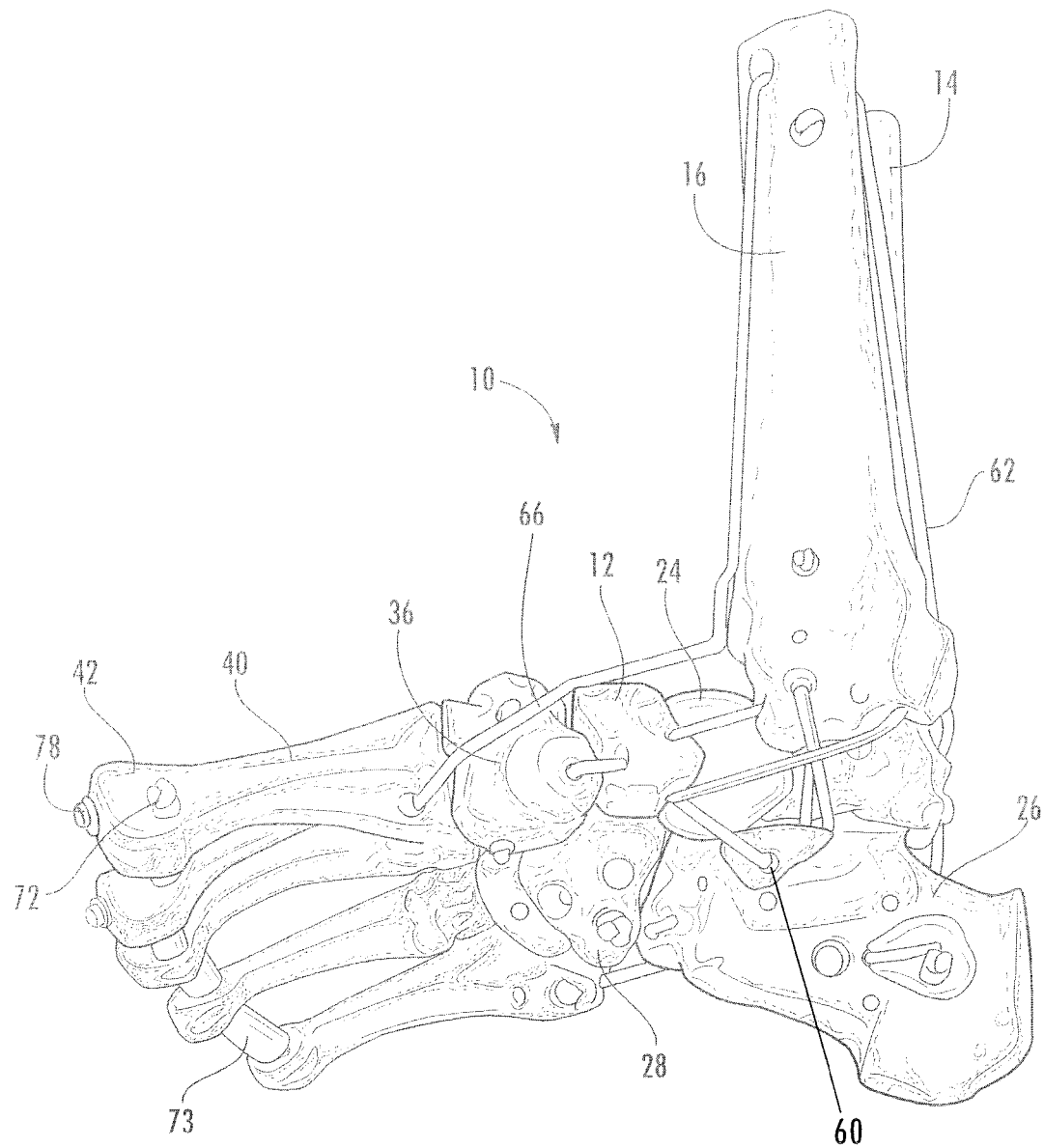
FIG. 1 is a perspective view of a foot model in a first position.
Figure 2:
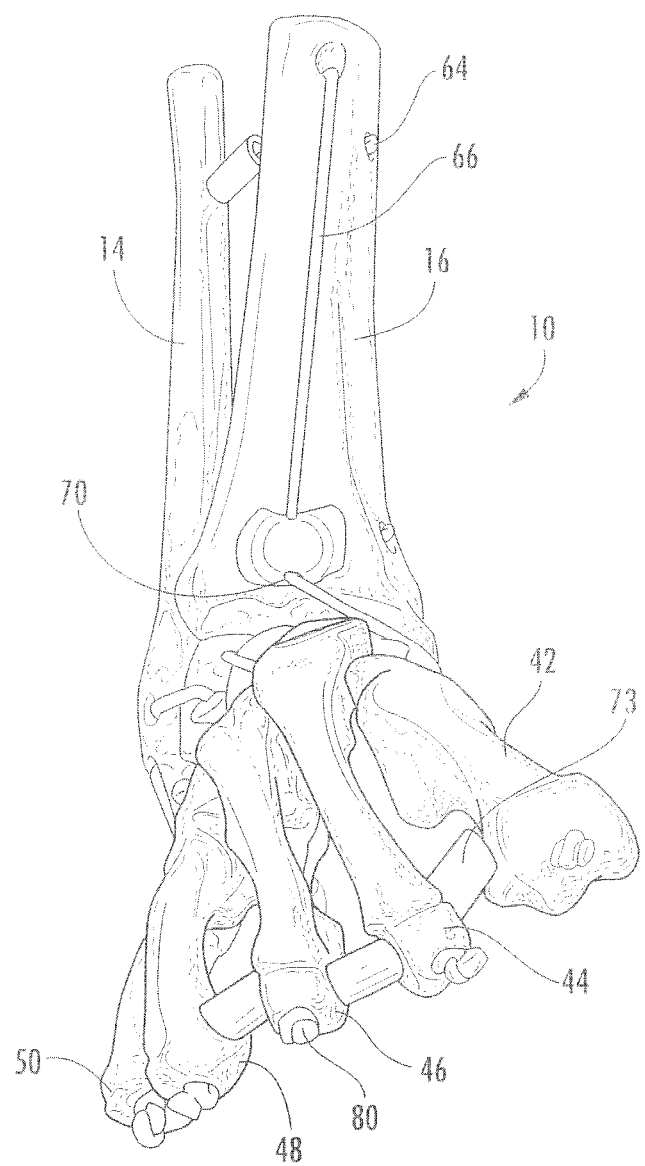
FIG. 2 is a front view of the foot model in the first position.
Figure 3:
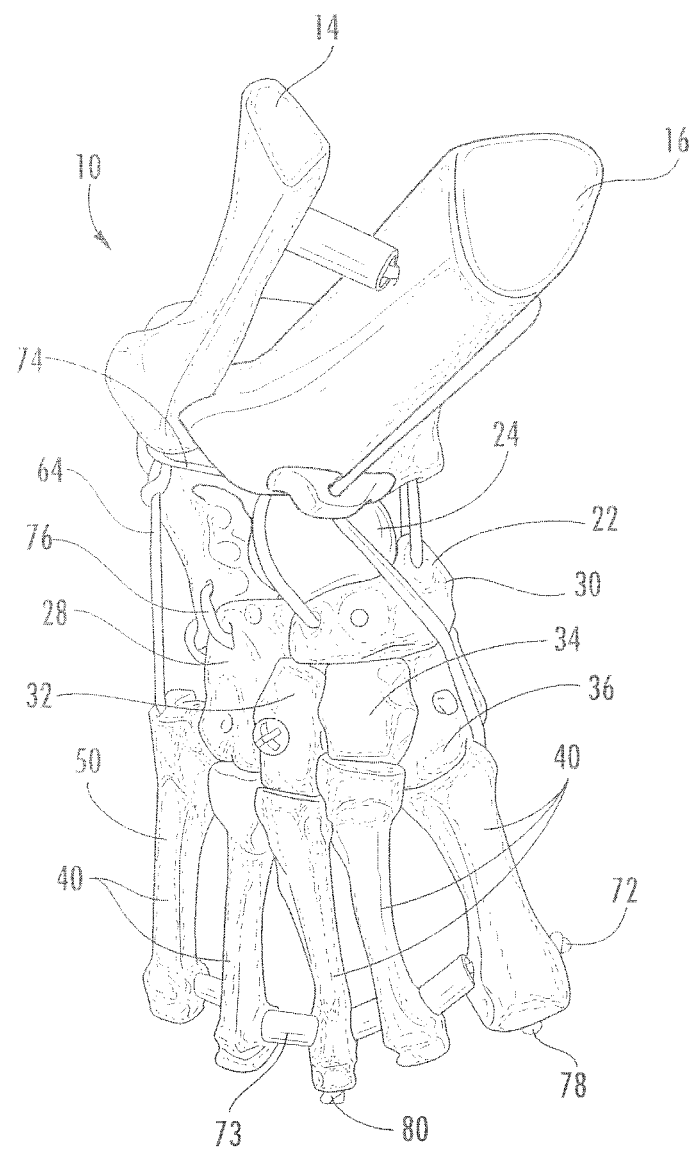
FIG. 3 is a top view of the foot model in the first position.

Now referring to the drawings, FIGS. 1-3 are different views of a foot model 10 in a first position. The same model 10 is shown in a second position in FIGS. 4-6. The first position demonstrates the normal skeletal structure of a human foot, whereas the second position demonstrates a human foot with a particular medical condition or disease. The foot model comprises segments 12 preferably made from plastic or other light weight materials. The segments 12 are shaped to resemble the bone structure of a human foot, although any animal's foot could be depicted by modifying the model 10 to reflect the particular animal's foot structure.

It is to be understood that any bone names in this specification are to refer to a particular segment or segments of the foot model representing human foot bones and not actual human bones. The segments 12 include segments representing the two lower leg bones, the fibula 14 and tibia 16, as well as the smaller bones including the metatarsals 40 and cuneiform bones 22. The tibia 16 and fibula 14 are substantially parallel with one another. Additionally, the tibia 16 rests upon the talus 24 which in turn rests upon the calcaneus 26. Anterior to the calcaneus 26 and the talus 24 are five fragments representing the cuboid 28, navicular 30, lateral cuneiform 32, intermediate cuneiform 34 and the medial cuneiform 36. The navicular 30 is positioned such that it abuts the cuboid 28, lateral cuneiform 32, intermediate cuneiform 34 and the medial cuneiform 36.

Again referring to FIGS. 1-3, metatarsals 40 are shown anterior to the cuboid 28, lateral cuneiform 32, intermediate cuneiform 34 and the medial cuneiform 36. The metatarsals 40 comprise a first, second, third, fourth, and fifth metatarsal. The first metatarsal 42 lies anterior to and abuts the medial cuneiform 36. The second metatarsal 44 lies anterior to and abuts the intermediate cuneiform 34. The third metatarsal 46 lies anterior to and abuts the lateral cuneiform 32. The fourth metatarsal 48 and the fifth metatarsal 50 lie anterior to and abut the cuboid 28.

Anterior to each metatarsal are a series of phalanges including a proximal phalange (not shown). Anterior to each proximal phalange, except the first proximal phalange, is a middle phalange (not shown). Anterior to each middle phalange is a distal phalange (not shown) and anterior to the first proximal phalange is a first distal phalange (not shown). The model 10 can be made with or without the phalanges. The condition of club foot and other foot ailments can be demonstrated without the phalanges. The model 10 with the phalanges can have the phalanges connected to the model 10 with cords or some other appropriate mechanism.

The segments 12 of the foot model 10 are preferably made from a lightweight material such as a plastic. The segments 12 can be made by a variety of well known techniques including injection molding. The segments can contain tunnels 60 that can be made by drilling or any other appropriate mechanism, or can be hollow to allow cords 62 to be drawn through them. At least a portion of the segments 12 are held together by at least one elastic cord 62. Any other string or connecting material that has at least some elasticity could be used in connecting the segments 12. Additionally, there is more than one way to arrange the cords 62 to maintain the correct anatomical shape and arrangements of the segments 12 representing the bones. The following is a description of the arrangement of the cords 62 for the preferred embodiment.

A first cord 64 is attached through a tunnel 60 in the tibia 16 on one side of the tibia 16 near the superior end. The first cord 64 is substantially horizontal and exits the tibia 16 at a second side which is opposite the first side. The first cord 64 then enters the fibula 14 through a hole on a first side and exits the opposite side of the fibula 14. Again the cord passes through the fibula 14 substantially horizontal. The first cord 64 then follows the length of the fibula 14 in a vertical direction wherein the first cord 64 enters a second set of holes and tunnels 60 in the lower fibula 14. The first cord 64 then exits the fibula 16 and spans to the posterior edge of the fifth metatarsal 50 in which a set of holes is placed. The first cord 64 is knotted on each end such that the cord 64 is secured on both ends to secure the cord 64 and help maintain the structure of the model 10.

A second cord 66 begins at the bottom side of the medial cuneiform 36 and follows a first tunnel through the medial cuneiform 36 such that the second cord 66 emerges at the anterior side of the medial cuneiform 36. The second cord 66 then enters the first metatarsal 42 at the posterior side and continues through the first metatarsal 42 and emerges on the bottom side of the first metatarsal 42 near the anterior end. The second cord 62 then makes its way to the front side of the tibia 16 where it enters a channel 70 and then exits the channel 70. The second cord 66 then follows the length of the tibia 16 in a substantially vertical direction and reenters the tibia 16 in a hole at the superior end which is located superior to the location where the first cord 64 traverses the tibia 16. The second cord 66 emerges from the back side of the tibia 16 and generally follows the length of the tibia 16 where the second cord 66 then enters a tunnel 60 on the back side of the tibia 16 near the anterior end. The second cord 66 then makes substantially a perpendicular turn and enters the anterior portion of the navicular 30 and emerges from the posterior portion of the navicular 30. Finally, the second cord 66 enters the medial cuneiform 36 again. The second cord 66 is knotted on both ends such that the second cord 66 remains in place and to help maintain the structure of the model 10.

A third cord 72 begins at a first side of the first metatarsal 42. The third cord 72 then exits an opposite side of the first metatarsal 42. The third cord 72 then does the same for the second, third, fourth and fifth metatarsals. The third cord 72 is knotted on each end to secure and maintain the position of the third cord 72. Plastic spacers 73 are also used around the third cord 72 between each metatarsal 40 allowing the metatarsals 40 to remain spaced from one another after the cord 72 is knotted.

A fourth cord 74 begins on a first side of the calcaneus 26. The fourth cord 74 exits the opposite side and then travels through a tunnel 60 on the inferior side of the fibula 14 and then back to the opposite side of the calcaneus 26. Finally, the fourth cord 74 reemerges on the first side of the calcaneus 26. The two ends of the fourth cord 74 are knotted to help keep the foot model 10 stabilized and to secure the cord 74, specifically maintaining the fibula 14 and calcaneus 26 in proper position.

A fifth cord 76 begins on the underside of the cuboid 28 and then emerges from the top side of the cuboid 28. The fifth cord 76 then enters the calcaneus 26 on the top side and then emerges at a second point of the top side. The fifth cord 76 then reenters the cuboid 28 and emerges on the underside of the cuboid 28. The two ends of the fifth cord 76 are knotted to help keep the foot model 10 stabilized and to secure the cord 76.

A first metatarsal cord 78 begins at the anterior portion of the first metatarsal 42 and emerges from the posterior end and then enters the medial cuneiform 36 and then the navicular 30. At that point the first metatarsal cord 78 reverses its path and enters the intermediate cuneiform 34 then the posterior portion of the second metatarsal 44 and eventually ends at the anterior end of the second metatarsal 44. The two ends of the first metatarsal cord 78 are knotted such that they help maintain the overall structure of the foot model 10 and secure the cord 78.

A third metatarsal cord 80 begins at the anterior of the third metatarsal 46 and emerges from the posterior end of the third metatarsal 46. The third metatarsal cord 80 then enters and exits the lateral cuneiform 32 and then enters and exits the navicular 30. The third metatarsal cord 80 then enters the talus 24 at a first point and exits a second point. The two ends of the third metatarsal cord 80 are knotted to further maintain the position of the third metatarsal cord 80 and the overall structure of the foot model 10.

The fourth metatarsal cord 82 begins at the anterior of the fourth metatarsal 48 and enters and exits a number of the segments 12 above. The fifth metatarsal cord 84 begins at the anterior of the fifth metatarsal 50 and enters and exits a number of the segments 12 above. The exact number and types of segments 12 may be varied as long as the model 10 is given proper stability. Other cords may be added to hold the segments 12 and model 10 in place.

Figure 4:
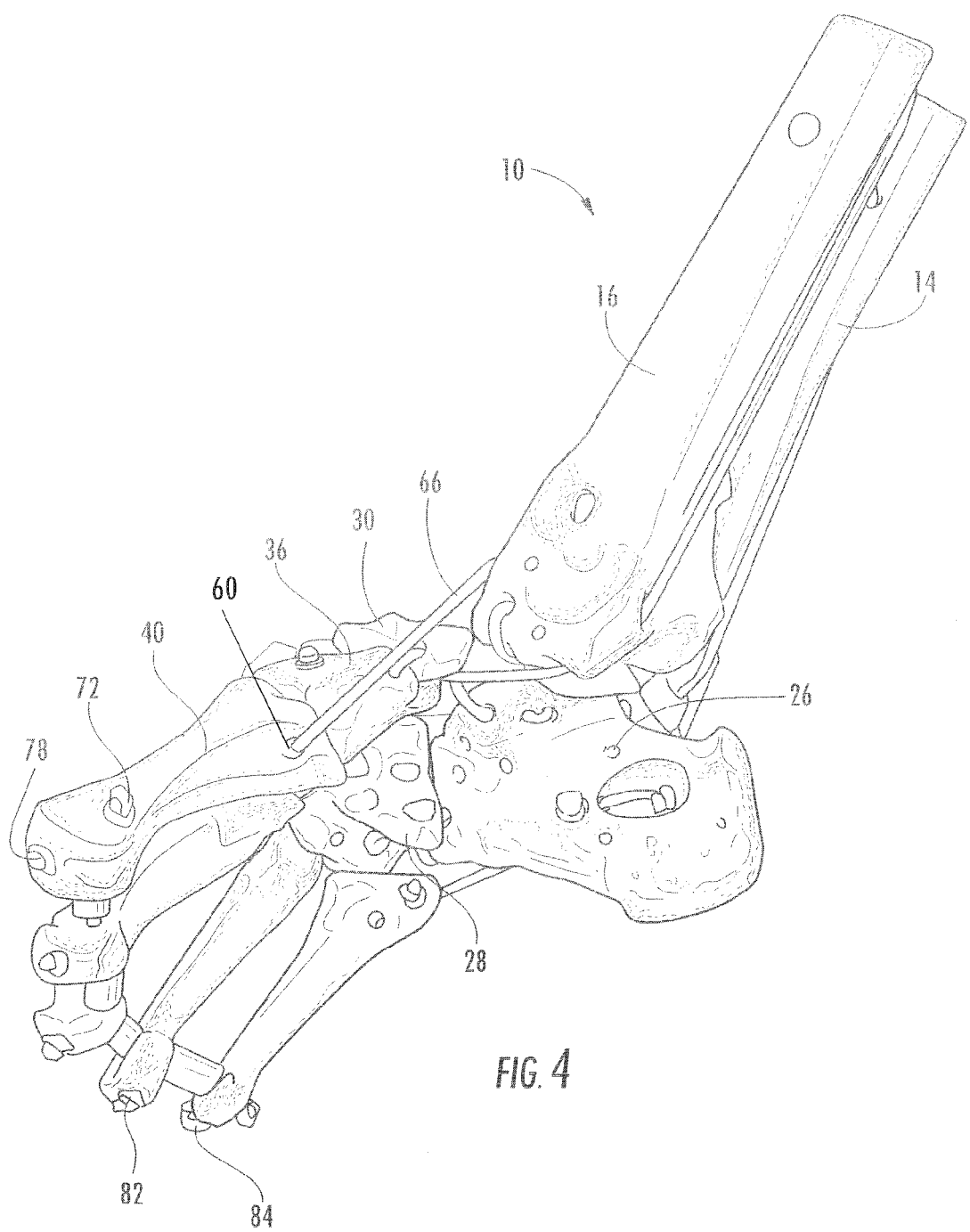
FIG. 4 is a perspective view of the foot model in a second position.
Figure 5:
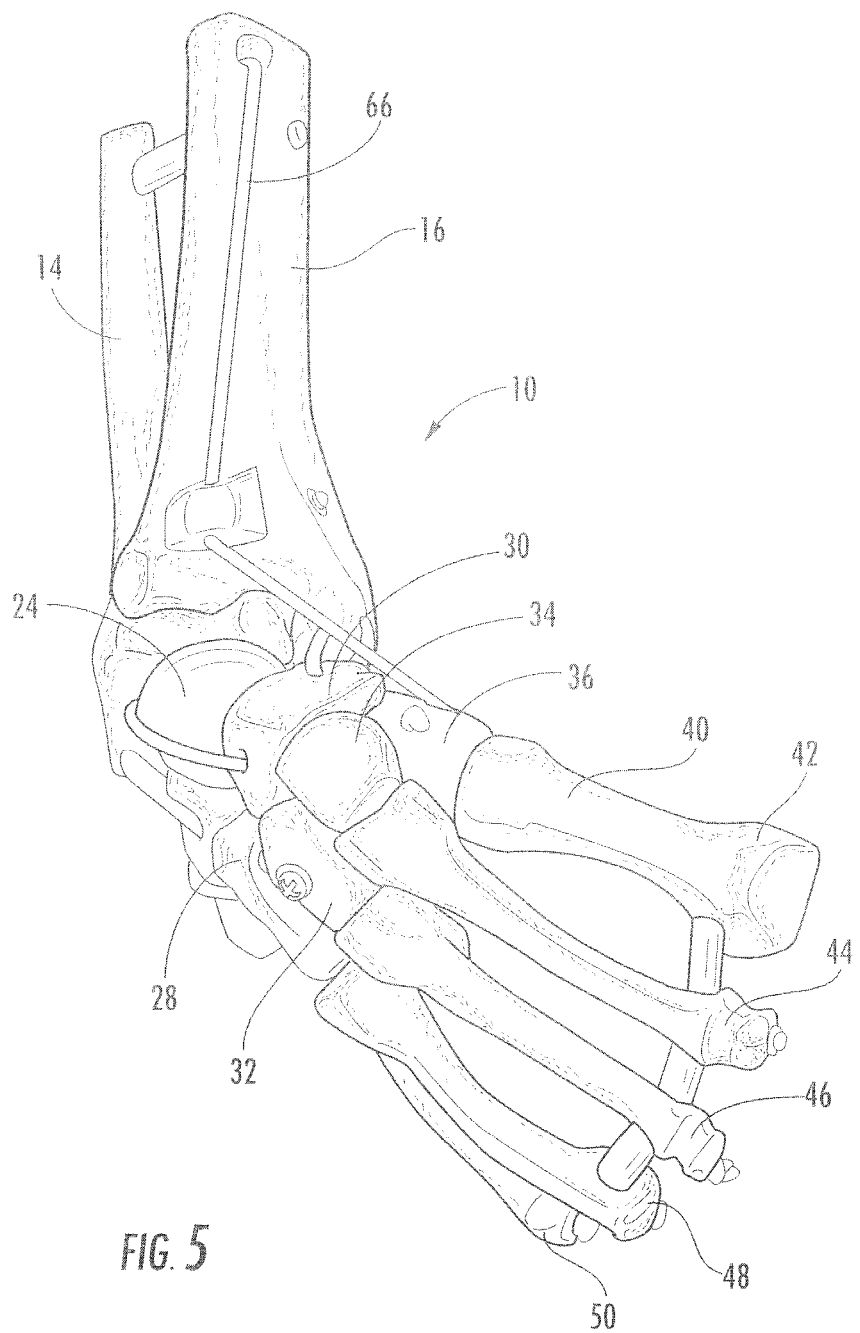
FIG. 5 is a front view of the foot model in the second position.
Figure 6:
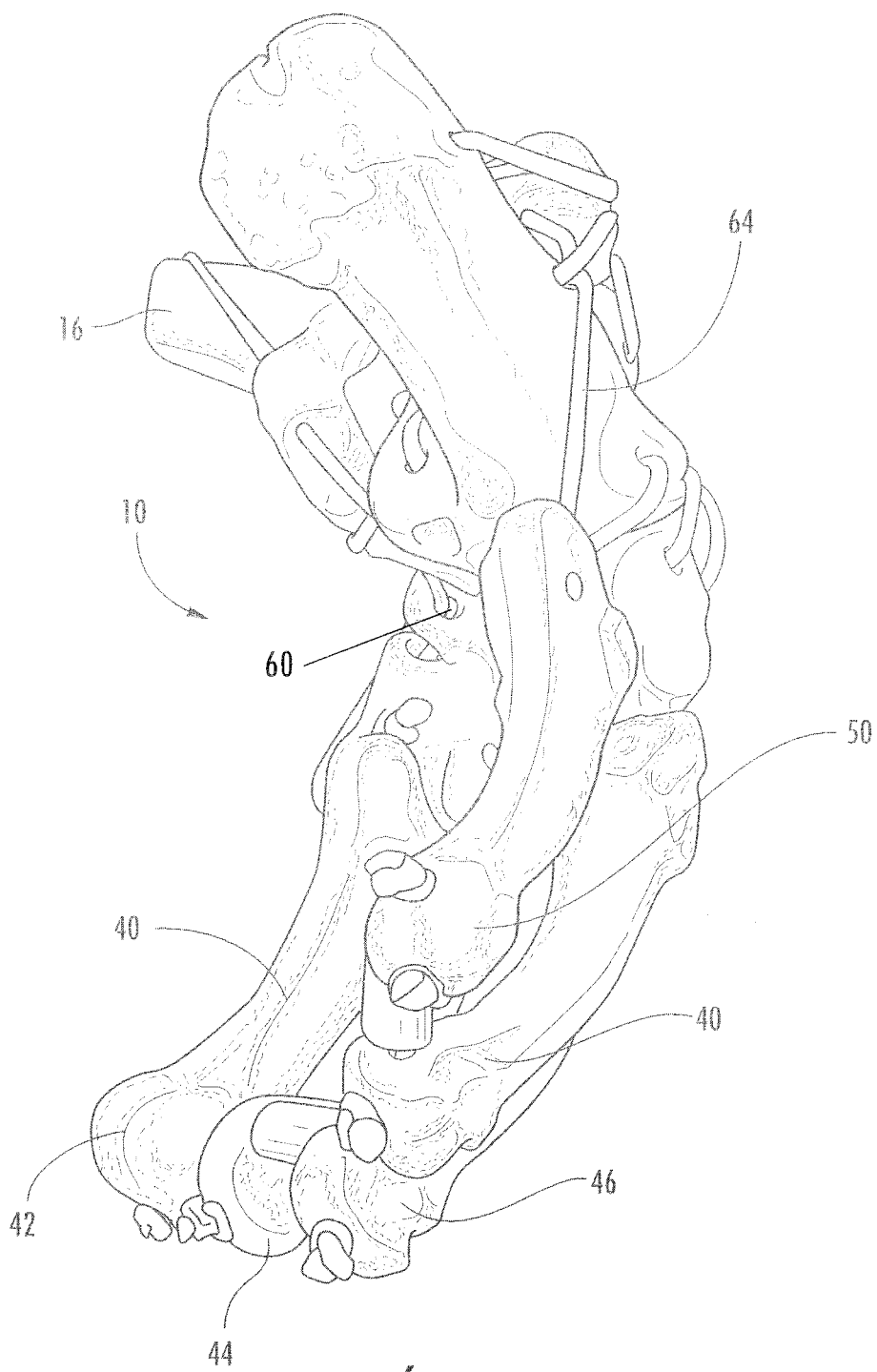
FIG. 6 is a bottom view of the foot model in the second position.

The cords 62 are preferably elastic and may be manipulated to demonstrate different positions of a human foot. A user may manipulate the cords 62 by pulling on the cords 62, moving a portion of the segments 12 or in combination to selectively move the model 10 between a first position and a second position. The elasticity of the cords 62 in conjunction with the resistance on the cords 62 provided by the segments 12 maintains the model in a particular position until the cords are manipulated by a user of the model 10. The foot model 10 can show a club foot (second position) as shown in FIGS. 4-6, a normal foot (first position) FIGS. 1-3 and any position in between.

Specifically, the user of the model 10 can manipulate the exposed portion of the cords 62 vertically running along the tibia 16 and fibula 14 to efficiently move the model 10 between the first and second positions. Cord 66 can be pulled vertically up to bring the model 10 into the second position. It is to be understood that a user can manipulate other cords to achieve the same effect. If beginning from the first position, at least one of the cords 62 is manipulated to bring the model 10 to the second position as shown in FIGS. 4-6. The cuneiforms 22 become more vertically orientated as well as the metatarsals 40. This configuration is typical of patients with club foot. The user can return the model 10 to the first position by again manipulating the cords and or the model 10.

Having thus described the invention in connection with the several embodiments thereof, it will be evident to those skilled in the art that various revisions can be made to the several embodiments described herein without departing from the spirit and scope of the invention. It is my intention, however, that all such revisions and modifications that are evident to those skilled in the art will be included within the scope of the following claims. Any elements of any embodiments disclosed herein can be used in combination with any elements of other embodiments disclosed herein in any manner to create different embodiments.

What is claimed is:

1. A model of a foot comprising:
a series of segments;
a plurality of cords;
the plurality of cords comprising a first cord and a second cord
the segments representing bones of a foot;
at least two of the segments having an internal tunnel;
at least a portion of the segments held together by the plurality of cords;
the first cord forming a pattern through the segments wherein the cord exits the internal tunnel of a first segment and enters the internal tunnel of a second segment;
the second segment non-adjacent the first segment;
the first cord and the second cord having a horizontal portion and a vertical portion;
the first cord and the second cord having a portion between horizontal and vertical;
the model movable by manipulation of the plurality of cords to move from a first position to a second position;
a resistance on the plurality of cords provided by the segments maintains the model in either the first position or the second position until the plurality of cords are manipulated by a user of the model.

2. The invention of claim 1, wherein:
the foot is a human foot.

3. The invention of claim 2, wherein:
the first cord and the second cord each have a first end and a second end;
the ends are knotted to maintain the first cord and the second cord in the tunnels.

4. The invention of claim 3, wherein:
the at least one cord is elastic.

5. The invention of claim 4, wherein:
the segments are made from a plastic.

6. The invention of claim 5, wherein:
at least one cord is pulled by a user of the model to selectively move a portion of the segments from the first position to the second position;
the segments maintain the second position until the at least one cord is again manipulated to selectively move the segments from the second position to the first position.

7. A model of a foot, comprising:
a series of segments;
a plurality of cords;
the plurality of cords comprising a first cord and a second cord;
the segments representing bones of a foot;
wherein one of the segments represents a tibia;
wherein one of the segments represents a fibula;
wherein one of the segments represents a metatarsal;
at least two of the segments having an internal tunnel;
at least a portion of the segments held together by the first cord of the plurality of cords;
the first cord forming a pattern through the segments wherein the first cord exits the internal tunnel of a first segment and enters the internal tunnel of a second segment;
the first cord horizontal between the segments representing the tibia and the fibula;
the first cord vertical between an upper portion of the fibula and a lower portion of the fibula;
the first cord spans to a posterior edge of the metatarsal in a vector between horizontal and vertical;
the second cord having a horizontal portion and a vertical portion;
the second cord having a portion between horizontal and vertical;
the model movable by manipulation of the plurality of cords to move from a first position to a second position;
a resistance on the plurality of cords provided by the segments maintains the model in either the first position or the second position until the plurality of cords are manipulated by a user of the model.

* * * * *